Sept. 18, 1928.  C. A. BORNMANN  1,684,531
FINDER
Filed Feb. 3, 1926
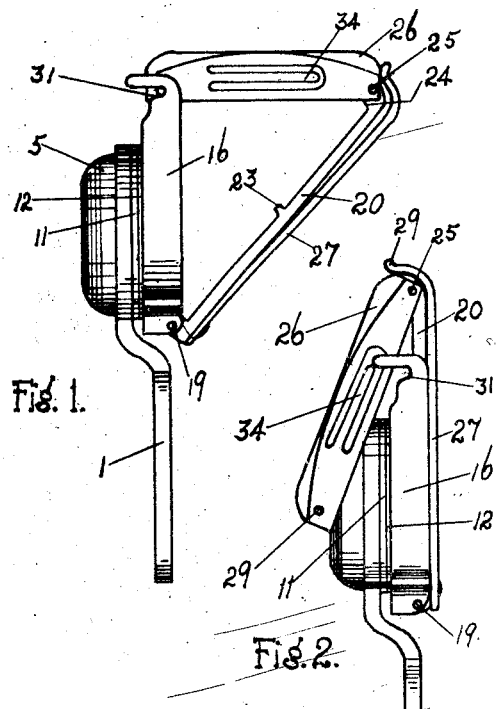
Fig. 1.
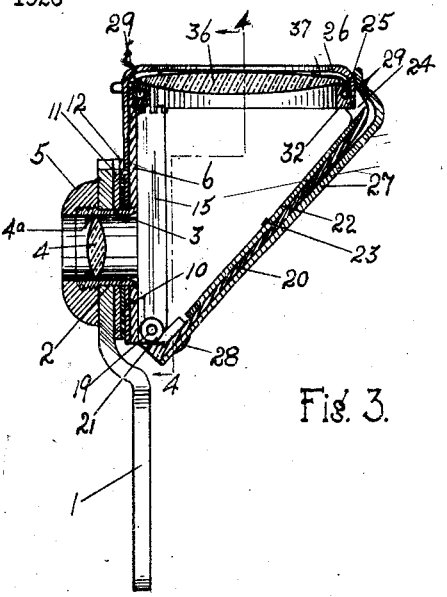
Fig. 2.
Fig. 3.
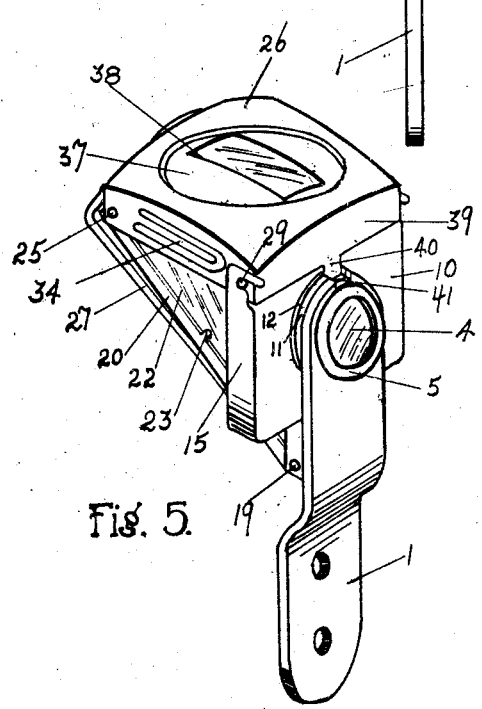
Fig. 5.
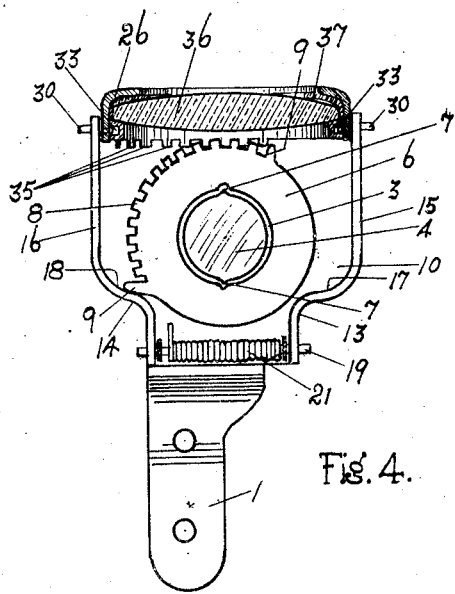
Fig. 4.
INVENTOR
CARL A. BORNMANN,
BY
ATTORNEY Patented Sept. 18, 1928.

1,684,531

UNITED STATES PATENT OFFICE.

CARL A. BORNMANN, OF BINGHAMTON, NEW YORK, ASSIGNOR, BY MESNE ASSIGNMENTS, TO AGFA ANSCO CORPORATION, OF BINGHAMTON, NEW YORK, A CORPORATION OF NEW YORK.

FINDER.

Application filed February 3, 1926. Serial No. 85,755.

My invention relates to finders for cameras, and principally to that type of finder provided with an automatically reversible diaphragm which enables the operator to view the exact image to be photographed through the finder in its proper proportions, the image being masked on all sides regardless of whether the same is in vertical or horizontal position.

The primary object of my invention is to provide such a finder which is foldable.

Another prime object is to provide such a folding finder with means for preventing the rotation of the diaphragm, except when said diaphragm and the operating means therefor are in their properly aligned position.

Another object is to provide a novel means for rotatably mounting the diaphragm in the finder.

Other objects and advantages in details of construction and operation will be apparent as the description proceeds, reference being had to the accompanying drawing wherein like reference numerals indicate like parts.

In the drawing:—

Figure 1 is a side view of my improved finder.

Figure 2 is a similar view showing the same folded.

Figure 3 is another side view of the finder in cross section.

Figure 4 is a cross sectional view of the finder taken on the lines 4—4 of Figure 3 and looking in the direction of the arrow.

Figure 5 is a perspective view of the finder.

The reference numeral 1 indicates the finder support which may be secured to a photographic camera or other instrument in any suitable manner. As shown in Figure 3, this support is apertured at its upper end as at 2, to receive a lens mount 3, with the lens 4 suitably secured therein as by the ring 4ª. As shown, the lens mount 3 is externally threaded to receive the threaded retaining cap 5, which when screwed into position bears against the finder support 1. The inner end of the lens mount 3 is provided with a circular flange 6, secured to the lens mount 3 in any suitable manner as by staking, shown at 7, in Figure 4. This flange 6 is thus made perfectly rigid with the lens mount 3. Gear teeth 8 are formed in the edge of the flange 6 over a portion of its circumference thus providing a fan gear. The end teeth 9 are preferably made longer than the others for a purpose to be described.

Rotatably mounted upon the barrel or periphery of the lens mount 3 is the front wall 10 of the finder. Between this wall 10 and the finder support 1 are two washers 11 and 12, the latter being preferably a very thin spring washer. This construction permits the rotation of the front wall 10 of the finder upon the lens mount 3, but enough friction is provided through the medium of the spring washer 12, so that when such finder wall is turned, it will remain in its adjusted position. This tension or friction may be adjusted by tightening or loosening the retaining link 5 threaded upon the outer end of the lens mount. The front wall 10 is shown near its lower edge as being offset laterally as at 13 and 14. The sides of this front wall are also flanged as at 15 and 16. Due to the offset just referred to, these flanges provide shoulders 17 and 18 against which the end teeth 9 of the flange gear 6 engage when the front wall is turned on its pivot. The teeth 9 and the shoulders 17 and 18 therefore provide limiting stops for the rotation of the front wall of the finder. It will be understood that the teeth 9 may be made slightly pliable or bendable, whereby the said stops or limiting members may be adjusted.

A pivot pin 19 extends between the lower ends of the flanges 15 and 16 and has bearing therein. Pivoted at its lower end, upon this pivot pin 19, is the back wall 20 of the finder. A coil spring 21 encircles the pivot pin 19 and has one end bearing against the front wall 10 of the finder, and the other end against the back wall 20 thereof whereby such walls are normally urged apart. As shown clearly in Figure 3, the back wall 20 of the finder slopes upwardly from its pivot at an angle to the front wall. A mirror or other reflecting surface 22 lies flat on the wall 20 and is securely retained in the position thereon by means of tongues 23 struck up from the sides of the wall 20, and turned inwardly over said mirror 22. Ears 24 are turned upwardly from the upper end of the rear wall 20 and a pivot pin 25 has bearing therein. A top plate or cap 26 is provided for the finder, and as shown is provided on all sides with downwardly turned flanges. The pivot pin 25 just referred to extends through two of these flanges as is shown clearly in the various figures, whereby the cap 26 is pivoted to the upper end of the back plate 20. A spring plate 27 is suitably secured as by rivets 28, at its lower end to the back plate 20 and extends upwardly throughout the length of the back plate and is provided at its upper end with the flange or finger 29 which bears against the rear flange of the cap 26. A slight tension is therefore placed upon the rear side of the cap 26, due to the spring material of the plate 27.

At the end of the cap 26, opposite that which is pivoted to the plate 20, is a second pivot pin 29, parallel with the pin 25. This pin 29 projects outwardly beyond the side flanges of the cap 26 as shown at 30. The upper end of the side flanges of the front walls 10 are, as clearly shown in Figures 1, 2 and 5, provided with recesses 31, which receive the projecting end 30 of the pin 29. It will be understood from the foregoing, that the back 20 and the cap 26 of the finder are normally urged to the position shown in Figures 1 and 3 by the coil spring 21. The recesses 31 just described, limit this backward movement of these parts. It will also be understood from the foregoing, that the back 20 may be pushed forwardly towards the lens mount to the position shown in Figure 2. Upon such movement of the back, the cap 26 pivots downwardly over the front of the lens mount, due to the spring action of the plate 27 carried on the back of the plate 20 and engaging the cap 26. This folding construction permits the finder to be used on cameras of restricted size.

Mounted beneath the cap 26, is a ring 32 having a recess 33 in its outer periphery. (See Figure 4.) The pivot pins 25 and 29 engage within this recess on two sides and spring fingers 34 cut from the two side flanges of the cap 26 engage within the recess on the sides opposite those engaged by the pin 29 and 25. Thus, the ring is maintained in position within the cap 26, but is permitted to rotate therein. The spring fingers 34 above mentioned bear frictionally against the ring within the recess and tend to hold the ring in its adjusted position. The lower edge of the ring 32 is for a portion of its circumference, formed with teeth 35 adapted, when the finder is opened or in the positions shown in Figures 1, 3, and 5, to engage with the teeth 8 of the flange gear 6. It will be understood then that with the parts in the position shown in Figure 3, if the finder now be rotated on its pivot on the lens mount 3, the ring 32 will be rotated in accordance with the movement of the finder.

Held between the ring 32 and the cap 26 is a lens 36 masked by a plate 37 between said lens and the cap 26. The mask 37 is rotatable with the ring 32 and lens 36 and is provided centrally thereof with a rectangular opening 38 through which the image is visible. It will be understood that if a vertical picture is to be taken with the camera, the finder should be in its vertical position shown in Figure 5 and in such position, the diaphragm opening 38 should be as shown in Figure 5. If a horizontal picture is to be taken, and the camera turned on its side, the finder will be rotated at right angles to the position shown in Figure 5 at which time the opening 38 will be horizontal. This adjustment takes place automatically as the body of the finder is rotated upon its pivot as just described.

In order to prevent the teeth 35 of the diaphragm from engaging with the teeth 8 of the fan gear 6 at all times except when the diaphragm is in its properly aligned position, means have been provided for preventing the cap 26 returning to its normal position shown in Figure 1 until the finder has been pivoted to its upright or vertical position. Referring to Figure 5, it will be noted that the front flange 39 of the cap 26 is provided centrally with a downwardly extending finger 40. This finger 40 is adapted to engage within a recess 41 cut through the top of the finder support 1 and the washers 11 and 12. When therefore, the finder is in its vertical position, the tongue 40 will be permitted to ride back through the recess 41 to a position in which the gear teeth 8 and 35 will inmesh with each other. If however, when the finder is in its folded position shown in Figure 2 and same is rotated on its pivot tightly and then opened, it will appear that the finger 40 will engage against the front of the top of the finder support 1, thus preventing the cap and the ring carried thereby from assuming their normal position shown in Figures 1 and 3. The teeth will not engage therefore and the finder will be inoperative until the same has been rotated to its vertical position when the finger 40 will slip through the recess 41 and the teeth be engaged whereupon the finder may be rotated to horizontal or vertical position at will and during such rotation, the diaphragm including the cap 26, lens 36, and mask 37 will automatically assume the proper position.

From the foregoing, it will be clear that I have provided means for positively preventing the proper use of the finder until the same has been brought to its vertical position. This eliminates accidental taking of pictures at an angle due to the finder diaphragm being out of alignment.

It will be understood that various changes in details of construction and operation will be possible without departing from the spirit and scope of the invention. I do not limit myself therefore to the exact structure shown and described, other than by the appended claims.

I claim:—

1. An article of manufacture comprising a support, a folding view finder rotatable on said support (means for automatically adjusting the field of said finder as the same is rotated on said support, and an element on said finder cooperating with means on said support, whereby said means is operative only when said finder is entirely unfolded.

2. An article of manufacture comprising a support, a folding view finder rotatable on said support, inter-engageable parts on said finder for automatically adjusting the field of said finder as the same is rotated, and means including an element on said finder cooperating with means on said support for permitting the engagement and disengagement of said parts in one position of said finder only.

3. An article of manufacture comprising a support, a folding view finder rotatable on said support, fixed gear teeth on said finder, a rotatable diaphragm in said finder provided with teeth engageable with said fixed teeth whereby the field of said finder is automatically adjusted upon rotation of said finder, and means including an element on said finder cooperating with means on said support for preventing the engagement and disengagement of said teeth in all but one position of said finder.

4. An article of manufacture comprising a support, a folding view finder rotatable on said support, relatively fixed gear teeth on said finder, a rotatable diaphragm in said finder foldable with relation to said gear teeth, teeth on said diaphragm engageable and disengageable with said gear teeth when said finder is entirely unfolded whereby the field of said finder is automatically adjusted upon rotation of said finder, and means comprising a finger carried by the foldable portion of said finder and a cooperating recess in said support, for preventing the engagement and disengagement of said teeth in all but one position of said finder.

5. An article of manufacture comprising a support, a view finder rotatable on said support, said finder having a relatively fixed part and a folding part, and means including an element on said finder cooperating with means on said support for preventing the folding or unfolding of said finder in all but one position of said finder on said support.

6. An article of manufacture comprising a support, a view finder rotatable on said support, said finder having a relatively fixed part and a folding part, and means for preventing the folding or unfolding of said finder in all but one position of said finder on said support, said means comprising a finger carried by said foldable part and cooperating with a recess in said support.

7. A view finder comprising front and rear walls, a top piece provided with side flanges, a diaphragm in said top piece provided with a circumferential groove, parallel pins running between two of said side flanges and engaging in said recess whereby said diaphragm is rotatably supported, one of said pins affording a pivot between said top piece and back wall, whereby said finder is foldable.

8. A view finder comprising front and rear walls, a top piece provided with side flanges, a diaphragm in said top piece provided with a circumferential groove, parallel pins running between two of said side flanges and engaging in said recess whereby said diaphragm is rotatably supported, one of said pins affording a pivot between said top piece and back wall, whereby said finder is foldable, and spring tongues struck from the other of said side walls and engaging frictionally within said recess.

CARL A. BORNMANN.